Aug. 22, 1961   J. P. GIBBS   2,997,678
ACCELEROMETER
Filed Sept. 23, 1957   4 Sheets-Sheet 1

INVENTOR.
JOSEPH P. GIBBS
BY
Christie, Parker & Hale
ATTORNEYS

Aug. 22, 1961     J. P. GIBBS     2,997,678
ACCELEROMETER

Filed Sept. 23, 1957     4 Sheets-Sheet 2

INVENTOR.
JOSEPH P. GIBBS
BY
Christie, Parker & Hale
ATTORNEYS

United States Patent Office 2,997,678
Patented Aug. 22, 1961

2,997,678
ACCELEROMETER
Joseph P. Gibbs, Pasadena, Calif., assignor, by mesne assignments, to Consolidated Electrodynamics Corporation, Pasadena, Calif., a corporation of California
Filed Sept. 23, 1957, Ser. No. 685,682
5 Claims. (Cl. 338—43)

This invention relates to an accelerometer and particularly to a spring-mass type of accelerometer.

Spring-mass accelerometers in which a potentiometer is utilized to sense displacement may be advantageously employed in many applications. This type of accelerometer is of value where a large electrical output is required to drive other instrumentation and where space or weight limitations preclude the use of complementary components such as electronic amplifiers. Such accelerometers are particularly adapted for use where static or low frequency accelerations are to be measured.

In conventional spring-mass accelerometers, the mass suspension system and the potentiometer wiper system are separate. A spring system supports the mass, and in turn the mass is connected to the potentiometer wiper. This arrangement has the disadvantage that a relatively large movement of the mass is required in order to obtain a reasonable length of wiper arm travel along the potentiometer. As a result, the natural frequency of the instrument is low so that only a low dynamic frequency range is measurable with the instrument. In those accelerometers in which the mass is supported by only the spring system, a further disadvantage is that there is introduced a pendulous suspension which causes the device to be sensitive to cross acceleration forces. Spurious responses are therefore included in the measurement of acceleration. Both of these disadvantages are overcome by the accelerometer of my invention.

My invention is an accelerometer comprising a base and an elongate restraining means joined at its opposite ends to the base and an end member respectively. The base, the restraining means and the end member form a ground system. A mass is slideably interconnected to the restraining means for displacement thereon limited by the end members. A flexure device is joined to the mass and the ground system so as to be subject to displacement responsive to movements of the mass relative to the ground system. A means is provided to sense displacements of the flexure device.

The particular advantage of the accelerometer of this invention is achieved through the use of a flexure system in which the spring system and the potentiometer wiper system are combined into a single movement-magnifying mechanism. Since one part of the flexure device is joined to a movable mass and the other part is joined to a ground system, a highly magnified displacement-indicating movement can be obtained for each mass movement. Accordingly, the instrument possesses a high natural resonant frequency and a correspondingly large range of dynamic response. In addition, since a pendulous-type of mass suspension is avoided, the effect of cross acceleration forces is minimized.

This invention and its manner of operation will be more clearly understood from the following description taken in conjunction with the accompanying drawings, in which.

Figure 1:
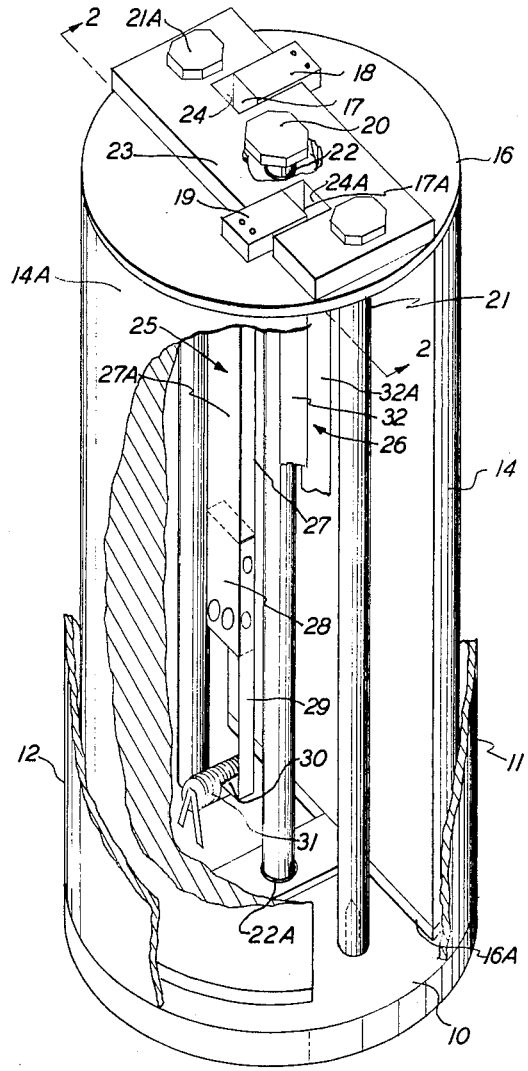
FIG. 1 is a perspective view, partially cut away, of one embodiment of the invention.
Figure 2:
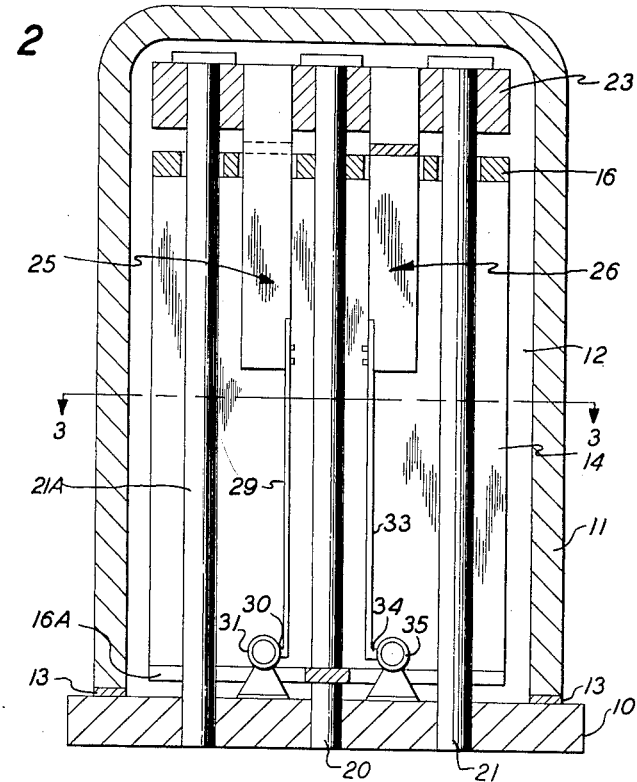
FIG. 2 is a sectional elevation taken along lines 2—2 of FIG. 1.
Figure 3:
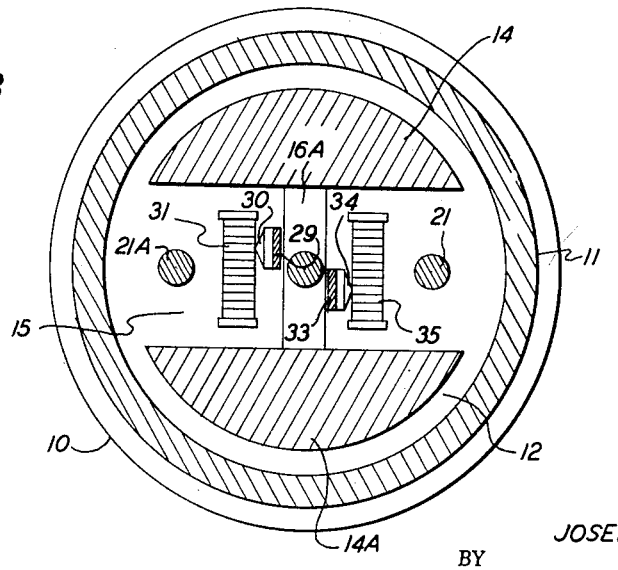
FIG. 3 is a plan view taken along lines 3—3 of FIG. 2.

The embodiment of the invention shown in FIGS. 1, 2 and 3 is an accelerometer of high precision in which means are provided to nullify the small effect of cross-acceleration forces. With reference to FIGS. 1, 2 and 3, a base 10 is joined by suitable means to a housing 11 to form an enclosure 12. A suitable gasket material 13 is placed between the housing and the base to insure that the enclosure so formed is fluid tight. A first D-shaped mass 14, having a semi-circular cross-sectional area, and a second D-shaped mass 14A, also having a semi-circular cross-sectional area, are oppositely located within the housing. The two masses are spaced apart and are positioned so that their flat surfaces face each other. In this manner, as particularly shown in FIG. 3, a space 15 is formed between the masses. It is to be understood that the masses may be constructed in other shapes than the one described above. The use of masses which are D-shaped merely provides one convenient method of compactly arranging the required elements within the housing.

A rigid cap plate 16 is shaped to cover the top of both masses and is rigidly joined to each mass. A bottom plate 16A rigidly joins the two masses at the bottom. This plate is cut away so that a connecting strip only joins the portions covering the bottoms of the masses. In this manner, in response to the application of a force, both masses and the two plates act as one mass. Two rectangular apertures 17 and 17A are formed within the cap plate. A first support piece 18 is rigidly joined to the cap plate and allowed to project for a portion of its length over aperture 17. A second support piece 19 rigidly joined to the cap plate is allowed to project for a portion of its length over aperture 17A.

A restraining rod 20 is rigidly joined at one of its longitudinal ends to a central location in the base. Two supporting rods 21 and 21A, positioned within space 15 between the two masses, are rigidly joined to the base at points substantially diametrically opposite. Restraining rod 20 passes through hole 22 in the cap plate and through hole 22A in the bottom plate. The diameter of the two holes is such as to provide a close sliding fit around the restraining rod. In this manner, the two plates, together with the two joined masses, are free to move with one degree of freedom along the longitudinal axis of the restraining rod. The two supporting rods pass through holes in the cap plate made so that a loose fit is provided. In this manner, while rods 21 and 21A provide a rigid support for the ground system, frictional contact between the movable mass and the restraining rod is limited to the surface where the restraining rod passes through the holes in the bottom and cap plates repectively.

The other end of the restraining rod, as well as the other end of each of the supporting rods, is rigidly joined to a rigid end member 23. The base, the rods and the end member together comprise a ground system. The end member is substantially rectangular in shape and has two slots 24 and 24A cut into opposite sides of the member so as to give it an S-shape configuration, as is particularly shown in FIG. 1. Slot 24 is positioned so that the portion of first support piece 18 projecting over aperture 17 in the cap plate coincides with it. Slot 24A is similarly positioned with respect to second support piece 19. The distance between the base and the end member is greater than the distance between the bottom plate and the top of the cap plate. This difference prescribes the maximum distance which the plates and the two masses, coacting as one mass upon application of a force, will move along the longitudinal axis of the restraining rod.

A first flexure device 25 and a second flexure device 26, identical twin-strip mechanisms, are separately mounted. The first flexure device comprises two flexible strips 27 and 27A. One end of flexible strip 27 is joined to first support piece 18 at its outermost edge projecting over aperture 17 in the cap plate. In this manner, through flexible strip 27, one leg of the first flexure device is joined to the movable mass comprising the cap plate and the two masses. The corresponding end of flexible strip 27A is joined to end member 23 at the inner edge of slot 24. In this manner, the other leg of the first flexure device is joined to the ground system formed by the base, the rods and the end member. Flexible strips 27 and 27A extend in parallel and are joined at their other end to opposite sides respectively of a connecting bridge block 28. A conductive extension pointer 29 is connected to a side of the bridge block between the two flexible strips and extends downwardly. A conductive contact piece 30 is joined to the bottom end of the extension pointer and is maintained in operative contact with a resistance wire coil 31 of a potentiometer system.

The second flexure device comprises two flexible strips 32 and 32A. One end of flexible strip 32 is joined to second support piece 19 at its outermost edge projecting over aperture 17A in the cap plate. One leg of the second flexure device is thereby joined to the movable mass. The end of flexible strip 32A corresponding to that of strip 32 is joined to end member 23 at the inner edge of slot 24A. In the manner previously described for the first flexure device, flexible strips 32 and 32A extend in parallel and are joined at their other end to opposite sides respectively of a connecting bridge block (not shown). A conductive extension pointer 33 is connected to a side of the bridge block between the flexible strips and extends downwardly. A conductive contact piece 34 is joined to the bottom end of the pointer and is maintained in operative contact with a resistance wire coil 35 of a potentiometer system.

The two flexure devices are mounted oppositely. Therefore, upon the application of an acceleration force along the linear axis of the restraining rod, the extension pointers of the two flexure devices are displaced equally but in opposite directions along their respective resistance wire coils. On the other hand, the small effect of cross-acceleration forces acting on secondary masses such as the connecting bridge blocks is to displace both extension pointers in the same direction. Therefore, the two resistance wire coils are placed electrically in parallel and connected into the potentiometer circuit so that a displacement of both pointers along the coils in the same direction is electrically cancelled. However, the electrical arrangement is such that equal displacement of both pointers in opposite directions produces an electrical signal substantially equivalent to that obtainable for the same displacement of a single pointer along one resistance wire coil. The elimination of cross-acceleration forces in this manner markedly improves the precision of the instrument.

Although not shown in FIGS. 1, 2 and 3, suitable electrical connections are provided for extension pointer 29 and the resistance wire coil 31 so as to complete the potentiometer electrical circuit. Similarly, suitable electrical connections are provided for extension pointer 33 and resistance wire coil 35.

For applications where the accuracy and precision provided through the use of two flexure devices symmetrically but oppositely mounted are not required, a single mass and a single flexure device may be used. It can be seen that the embodiment of the invention shown in FIGS. 1, 2 and 3 can readily be modified to provide an instrument containing a single flexure device.

Figure 4:
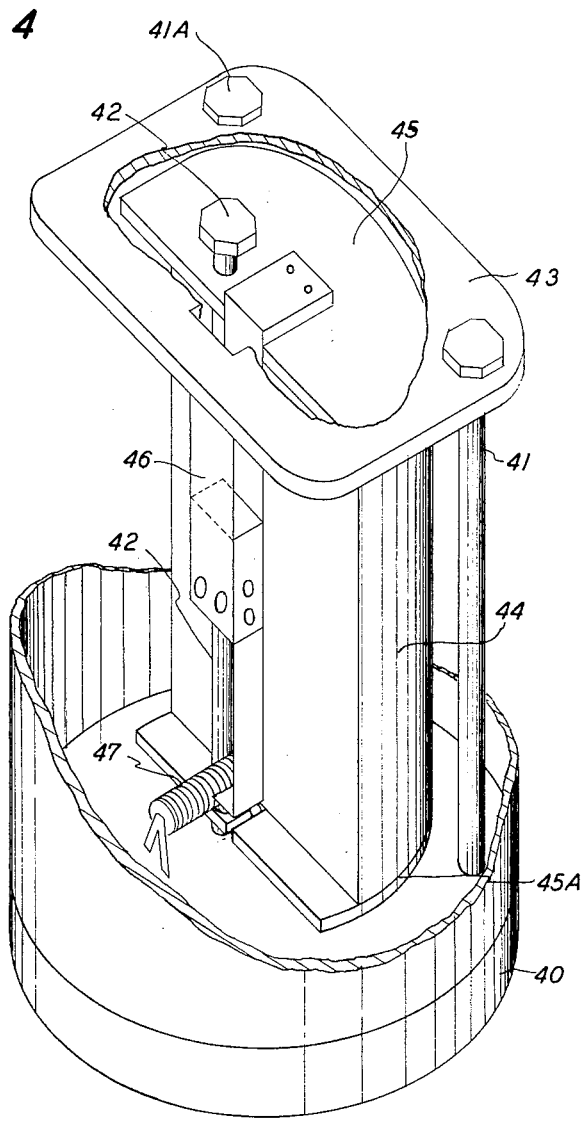
FIG. 4 is a sectional elevation of another embodiment of the invention.

An embodiment of an accelerometer containing a single flexure device is shown in FIG. 4. A base 40, two supporting rods 41 and 41A, a restraining rod 42, and a rigid end member 43 comprise the ground system. A D-shaped mass 44, a semi-circular cap plate 45, and a semi-circular bottom plate 45A comprise the movable mass. A single flexure device 46 comprising the same elements as previously described in connection with FIGS. 1, 2 and 3, is joined to the ground system and the movable mass as described in connection with those figures. The flexure device is maintained in operative contact with a resistance wire coil 47 of a potentiometer system. Suitable electrical connections (not shown) are provided to complete the potentiometer circuit.

Figure 5:
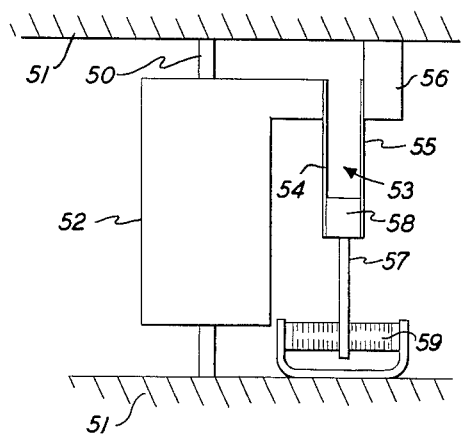
FIG. 5 is a schematic representation of the invention.
Figure 6:
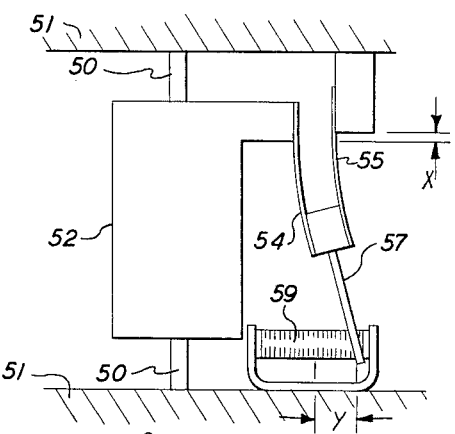
FIG. 6 is a schematic representation showing the response of this accelerometer to an acceleration force.

The operation of the accelerometer of the invention will be understood by reference to schematic illustration shown in FIGS. 5 and 6. The schematic drawings are made for a system involving the use of one mass and one flexure device. It is to be understood that the operation of each of the flexure devices shown in FIGS. 1, 2 and 3 will be the same as for the single mass described below.

As schematically represented, a restraining rod 50, rigidly joined at each of its longitudinal ends to a ground system 51, limits the movement of a mass 52 to one degree of freedom. A flexure device 53 is joined by means of two parallel flexible strips 54 and 55 to the mass 52 and, through a support 56, to the ground system 51. An extension pointer 57, extending from a bridge block 58 connecting the ends of the flexible strips, is maintained in operative contact with a resistance wire coil 59 of a potentiometer.

Flexible strip 54, flexible strip 55, the bridge block and the extension pointer comprise the potentiometer wiper-arm portion of the system. On the other hand, flexible spring 54, flexible spring 55 and the bridge block comprise the supporting-spring system for the mass. In this manner the flexure device consolidates the system functions into one device.

In FIG. 6 the action of the mechanism upon application of an acceleration force is shown. Upon a movement of mass 52 by the distance $x$, flexible strips 54 and 55 are deflected so as to cause pointer 57 to move along resistance wire coil 57 a distance $y$. The resistance changes in the potentiometer circuit caused by changes in position of the pointer along the resistance wire coil can be electrically determined and calibrated in terms of the magnitude of the acceleration force applied. It can be seen that, by the application of the proper geometrical parameters, a highly magnified linear sweep of pointer 57 across the resistance wire coil of the potentiometer system can be achieved with a small displacement of mass 52. In this manner the natural frequency of the instrument is improved on the order of three times over that of a system not consolidating the functions as provided by this invention.

Figure 7:
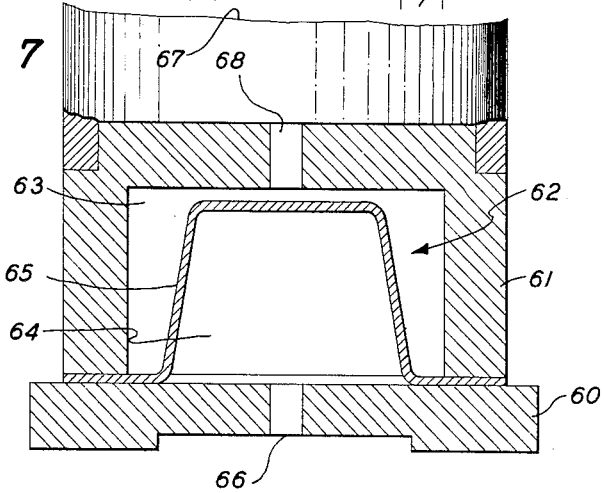
FIG. 7 is an elevational view showing an advantageous modification of the base piece of the accelerometer of the invention.

As previously described with references to FIGS. 1, 2 and 3, a housing 11 is provided so as to form a fluid-tight enclosure with a base 10. A means is thereby provided so that, if desired, the enclosure can be filled with a damping fluid so as to control the frequency response of the instrument. Oil is an example of a damping fluid used for this purpose. However, it is desirable to provide means to relieve pressure increases caused by thermal expansion of the incompressible damping fluid when the instrument is subjected to changes in temperature. The modification of the base shown in FIG. 7 accomplishes this purpose.

A base 60 is joined to a cap member 61 containing a hollowed-out section so that an enclosure 62 is formed between the base and the cap member. A suitable gasket material provides a fluid-tight seal between the base and the cap member. The enclosure thus formed is divided into an upper chamber 63 and a lower chamber 64 by means of a deformable diaphragm 65. The diaphragm may be made of any material which can be readily deformed upon the application of pressure and can also be used as a gasket between the base and the cap member. The lower chamber is maintained in contact with ambient pressure by means of an opening 66 provided in the base. The upper chamber is filled with the same damping fluid as is contained in a second enclosure 67 in which the instrument elements are housed. Equalization of pressure between enclosure 67 and the upper chamber is achieved by means of an opening 68 in the cap member. In operation, the diaphragm permits expansion of the damping fluid with increasing temperature so that no increase in pressure occurs within the accelerometer housing.

The accelerometer of this invention provides advantages which makes possible the use of this instrument in a wide variety of applications. It provides advantages of simplicity of design so that the effect of secondary masses is minimized. In addition, there are no pivots or bearings in the spring wiper system so that the life of the instrument is prolonged by the absence of such wearing surfaces. It particularly provides the advantage that a large magnification of mass movement can be obtained so that the instrument can be utilized where a large dynamic frequency range is required. Its utility is further enhanced by the provision of means for cancelling the effect of cross acceleration forces.

It is apparent that modifications of the accelerometer of the invention other than those described herein may be made without departing from the basic concept of the invention. For example, displacement sensing means other than a potentiometer system, such as a system involving a variable transformer, could be employed. However, the potentiometer system provides a convenient method of obtaining a large direct current electrical output. Similarly, other arrangements of the restraining means, as for example the use of two diametrically opposite restraining rods without the use of a centrally-located restraining rod, may be employed. Such modifications fall within the scope of the invention.

I claim:

1. An accelerometer comprising a base, an elongate restraining means joined at its opposite ends to the base and an end member respectively to form a ground system, a mass slideably interconnected with the restraining means for displacement thereon limited by the base and the end member, two flexure devices spaced apart and each oppositely joined to the mass and the ground system to be subject to equal but opposite displacement responsive to movements of the mass relative to the ground system and means operable to sense displacement of each flexure device.

2. An accelerometer comprising a base, an elongate restraining means joined at its opposite ends to the base and an end member respectively to form a ground system, two masses spaced apart and rigidly joined on opposite ends by two plates so as to act as one mass upon application of a force, the plates being slideably interconnected with the restraining means for displacement thereon limited by the base and the end member, two flexure devices spaced apart, each flexure device comprising two parallel flexible strips, one end of one strip being joined to the end member of the ground system and a corresponding end of the other strip being joined to the plate on the same end as the end member, the other end of each strip being joined to opposite sides respectively of a connecting bridge block, and an extension pointer extending from the block and adapted to be in operative contact with a resistance wire coil of a potentiometer system, each flexure device being symmetrically but oppositely mounted so that the extension pointers of each flexure device are displaced equally but oppositely along their respective resistance wire coils responsive to movements of the mass relative to the ground system.

3. An accelerometer comprising a base, an elongate restraining means joined at its opposite ends to the base and an end member respectively to form a ground system, a mass slideably interconnected to the restraining means for axial displacement thereon limited by the base and the end member, displacement-sensing means, and an elongate flexure device including two parallel flexible strips resiliently joining at one end the mass and the ground system and having an unsupported other end in operative engagement with the displacement-sensing means whereby deflections of the one end of the elongate flexure device responsive to acceleration-induced axial movements of the mass relative to the ground system produce magnified substantially transverse movements of said unsupported end relative to the displacement-sensing means.

4. An accelerometer comprising a base, an elongate restraining means joined at its opposite ends to the base and an end member respectively to form a ground system, a mass slideably interconnected to the restraining means for axial displacement thereon limited to one degree of freedom, a resistance wire coil electrically connected in a potentiometric system, and an elongate flat flexure device including two parallel flexible strips resiliently joining at one end the mass and the ground system and having an unsupported other end in operative slidable engagement with the resistance wire coil whereby deflections of the flexure device responsive to acceleration-induced axial movements of the mass relative to the ground system produce magnified substantially transverse movements of said unsupported end relative to the resistance wire coil.

5. An accelerometer comprising a base; an elongate restraining means joined at its opposite ends to the base and an end member respectively to form a ground system; a mass slidably interconnected to the restraining means for axial displacement thereon limited by the base and the end member; a flexure device including two flexible strips disposed substantially parallel to the restraining means, the corresponding one ends of each strip joined to the mass and ground system respectively to bias said mass, the corresponding other ends of each strip being interconnected whereby axial displacement of the mass produces substantially transverse displacement of the interconnected ends of the two strips; and means adapted to said interconnected ends of the two flexible strips to sense transverse displacements of said ends responsive to movements of the mass relative to the ground system.

References Cited in the file of this patent

UNITED STATES PATENTS

| 1,943,850 | Truman | Jan. 16, 1934 |
| 2,307,917 | Clewell | Jan. 12, 1943 |
| 2,332,994 | Draper et al. | Oct. 26, 1943 |
| 2,618,776 | Wiancko | Nov. 18, 1952 |
| 2,702,186 | Head et al. | Feb. 15, 1955 |
| 2,831,670 | Bourns et al. | Apr. 22, 1958 |
| 2,886,676 | Bourns et al | May 12, 1959 |

FOREIGN PATENTS

| 198,865 | Switzerland | July 15, 1938 |